United States Patent [19]

Nakamura

[11] Patent Number: 4,499,522

[45] Date of Patent: Feb. 12, 1985

[54] FLYBACK TRANSFORMER

[75] Inventor: Kenzi Nakamura, Katano, Japan

[73] Assignee: Sanyo Electric Co., Ltd., Osaka, Japan

[21] Appl. No.: 393,767

[22] Filed: Jun. 30, 1982

[30] Foreign Application Priority Data

Jun. 30, 1981 [JP] Japan .............................. 56-98145[U]
Jul. 31, 1981 [JP] Japan ............................ 56-114811[U]

[51] Int. Cl.³ ...................... H01F 27/04; H01F 27/06
[52] U.S. Cl. ..................................... 361/331; 336/65; 336/90; 336/107
[58] Field of Search ................. 336/105, 65, 107, 150, 336/90, 98; 363/126; 323/355; 361/331, 332, 390, 400, 391, 405, 268

[56] References Cited

U.S. PATENT DOCUMENTS 3,959,760  5/1976  Ouellette et al. ................... 336/107

*Primary Examiner*—Thomas J. Kozma
*Attorney, Agent, or Firm*—Armstrong, Nikaido, Marmelstein & Kubovcik

[57] ABSTRACT

A flyback transformer includes a coil unit, a variable resistor unit detachably mounted on the coil unit and a connector for electrically connecting the coil unit and the variable resistor unit. The coil unit has a casing, primary and secondary coils accommodated in the casing, and a terminal which is electrically connected to a center tap of the secondary coil through a lead line extending inside the casing. The variable resistor unit has a circuit board deposited with ohmic resistance stripes and a terminal which is electrically connected to the circuit board. The connector having a U-shape configuration electrically connects the terminal of the coil unit and the terminal of the variable resistor unit.

19 Claims, 20 Drawing Figures

FLYBACK TRANSFORMER

BACKGROUND OF THE INVENTION

1. Field of the Invention

The present invention relates to a transformer and, more particularly, to an improved arrangement of a flyback transformer for use in a television receiver wherein the flyback transformer is installed with electric parts, such as variable resistors.

2. Description of the Prior Art

A flyback transformer for use in a television receiver generally includes a primary coil for receiving a low voltage and a secondary coil for producing a high voltage. The high voltage produced from the secondary coil is applied to a cathode ray tube for effecting the horizontal deflection.

According to a recent flyback transformer, a tap is provided intermediately on the secondary coil for producing a predetermined voltage used for focusing an image on the cathode ray tube and/or for applying a potential to a screen grid of the cathode ray tube. Since the voltage for focusing the image (hereinafter referred to as a focusing voltage) and the voltage for applying a potential to the screen grid (hereinafter referred to as a screen voltage) are required to be adjusted to predetermined voltages, a lead line extending from the tap is connected to first and second variable resistors, in which the first variable resistor is provided to produce the focusing voltage and the second variable resistor is provided to produce the screen voltage.

Initially, such variable resistors have been provided separately from the flyback transformer. However, from the view point of reducing the number of constructing parts, many approaches have been made to install the variable resistors on the flyback transformer. An example of one prior art flyback transformer installed with variable resistors is explained below.

Figures 1, 2, 3:
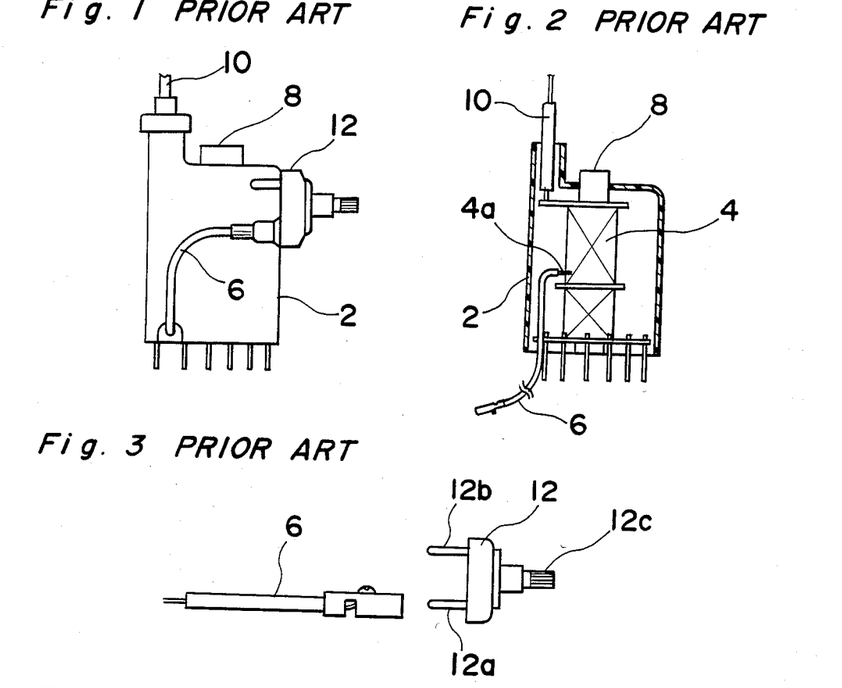
FIG. 1 is a side elevational view of a flyback transformer according to the prior art.
FIG. 2 is a cross-sectional view of the flyback transformer of FIG. 1.
FIG. 3 is a side view showing a manner in which the variable resistor unit is connected to lead line according to the prior art.

Referring to FIGS. 1 and 2, the prior art flyback transformer installed with variable resistor(s) includes a casing 2, the primary and secondary coil mounted on inner and outer bobbins, respectively, (only the secondary coil is shown in FIG. 2 with reference numeral 4), and a lead line 6 extending from an intermediate tap 4a of the secondary coil 4. The end of the secondary coil 4 is connected to a cathode ray tube (not shown) through a lead line 10 for effecting the horizontal deflection. A ferrite core 8 having an O-shape configuration extends through the inner bobbin.

The prior art flyback transformer further includes a variable resistor unit 12 rigidly secured on the casing 2 by means of, e.g., securing screw. The variable resistor unit 12 as shown in FIG. 3 includes two pins 12a and 12b and a knob 12c. The pin 12a is provided for the connection with the lead line 6 which is extending outwardly from an opening formed at the bottom of the casing 2 and along a side wall of the casing to the variable resistor unit 12. When the knob 12c is turned, a variable resistor (not shown) incorporated in the unit 12 is so adjusted as to produce the focusing voltage. A similar variable resistor unit is further provided on the casing 2 for producing the screen voltage.

According to the above described prior art transformer, there are such disadvantages that the lead line 6 carrying a relatively high voltage extends outside the casing and, therefore, the maintenance of the flyback transformer is rather difficult and, at the same time, the size of the flyback transformer becomes bulky.

Another prior art flyback transformer (not shown) has a variable resistor unit incorporated inside the casing. According to this type of flyback transformer, the variable resistor unit is placed inside the casing before the casing is packed with synthetic resin. Therefore, the synthetic resin is casted in the casing to fixedly support the coils, variable resistor unit, and other components in the casing. Thus, the flyback transformer of this type has such a disadvantage that it is impossible to exchange the variable resistor.

SUMMARY OF THE INVENTION

The present invention has been developed with a view to substantially solving the above described disadvantages and has for its essential object to provide an improved flyback transformer having a coil unit accommodated in a casing, a variable resistor unit detachably mounted on the casing, and a connector for connecting the coil of the transformer with the variable resistor unit without employing any lead line that extends on the side of the transformer casing.

It is also an essential object of the present invention to provide a flyback transformer of the above described type which is simple in construction, compact in size and can readily be manufactured at low cost.

In accomplishing these and other objects, a flyback transformer according to the present invention comprises: a casing having a first opening means formed therein; a first terminal means positioned in the first opening means; an engagable means fixedly mounted on the casing; a coil means accommodated in the casing, the coil means electrically connected to the first terminal means through an electric path provided inside the casing; a housing having a second opening means formed therein; a second terminal means positioned in the second opening means; an electric element means accommodated in the housing, the electric element means electrically connected to second terminal means; an engaging means fixedly mounted on the housing for the engagement with the engagable means so as to mechanically and detachably connect the housing to the casing; and a connector having an electric conductor mounted therein, first end of the connector being connectable to the first opening means, and second end of the connector being connectable to the second opening means, whereby the first terminal means is electrically connected to the second terminal means through the electric conductor.

According to the preferred embodiment, the connector has a configuration of U-shape.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIG. 11b is a cross-sectional view taken along a line XIb—XIb shown in FIG. 11a;

DESCRIPTION OF THE PREFERRED EMBODIMENTS

Figure 4:
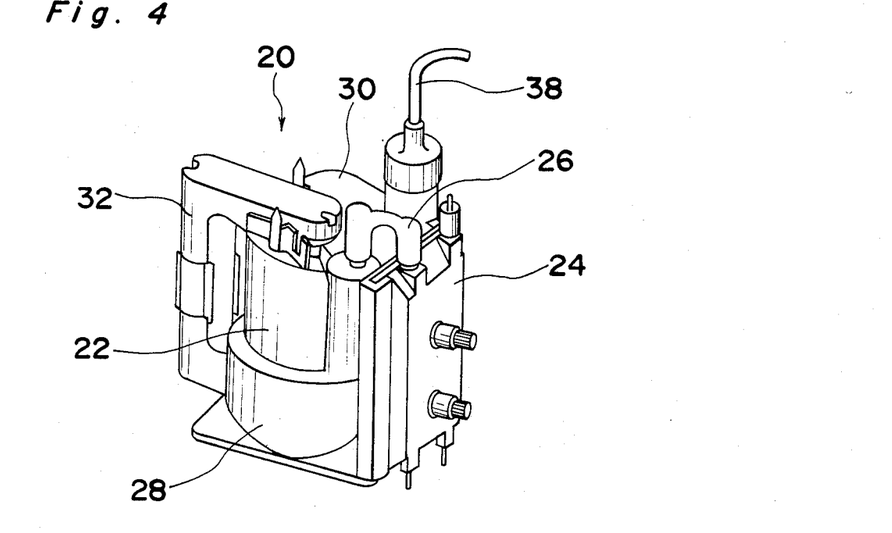
FIG. 4 is a perspective view of a flyback transformer according to one embodiment of the present invention.
Figures 5, 8:
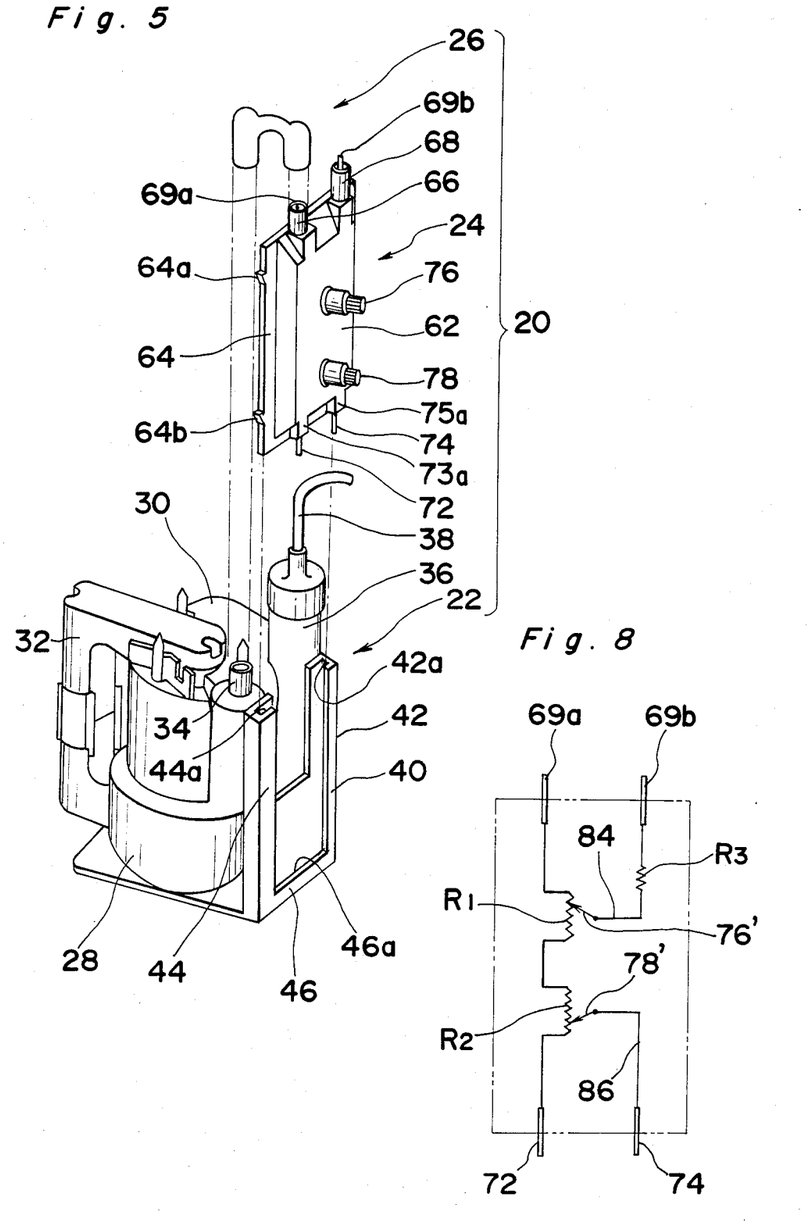
FIG. 5 is an exploded view of the flyback transformer of FIG. 4.
FIG. 8 is a circuit diagram showing an example of a variable resistor unit employed in the flyback transformer of the present invention.

Referring to FIGS. 4 and 5, a flyback transformer 20 according to a first embodiment of the present invention can be divided into a coil unit 22, a variable resistor unit 24 and a connector 26. Each of these units is described in detail below.

Figure 6:
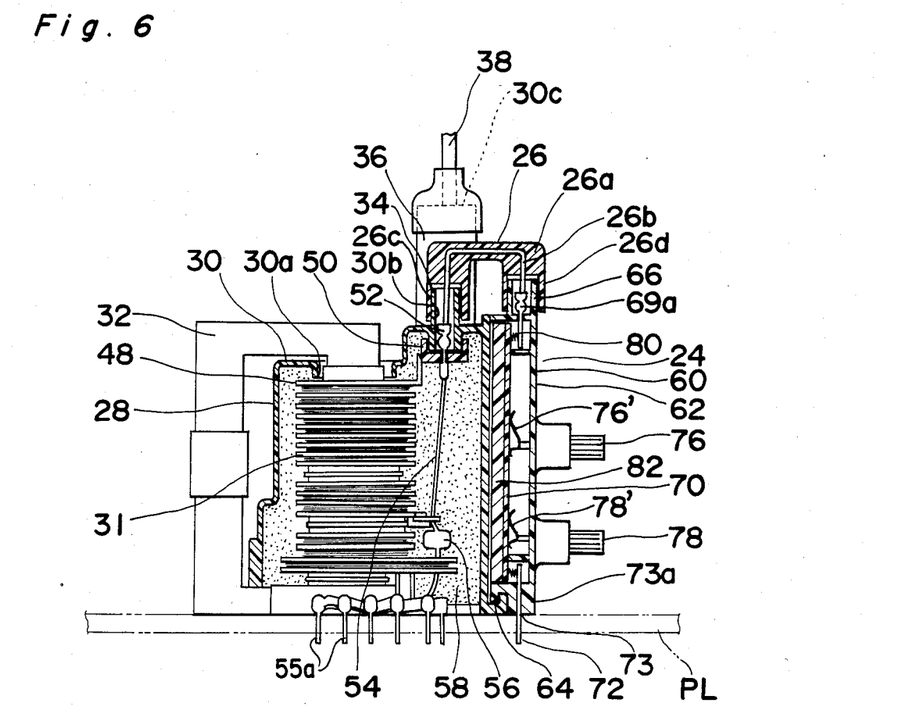
FIG. 6 is a cross-sectional view of the flyback transformer of FIG. 4.
Figure 9A:
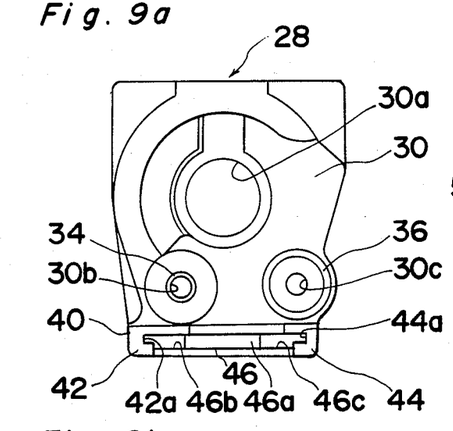
FIGS. 9a, 9b and 9c are top, side and bottom plan views, respectively, of a casing used for the flyback transformer of FIG. 4.
Figure 9B:
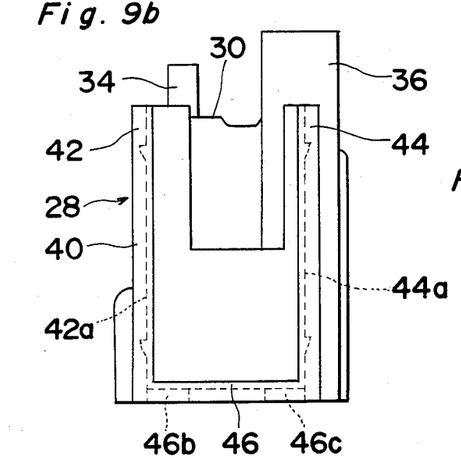
Figure 9C:
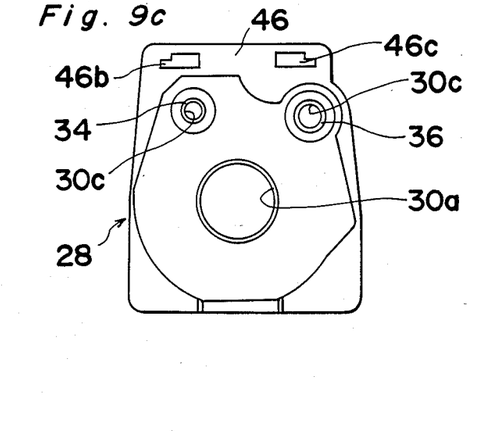

The coil unit 22 comprises a semi-cylindrical casing 28 made of synthetic resin. The casing 28 is best shown in FIGS. 9a, 9b and 9c, in which FIGS. 9a, 9b and 9c show top, side and bottom plan views of the casing 28, respectively. A bottom end of the cylindrical casing 28 is opened and a top end of the same is closed by a top plate 30. The top plate 30 is formed with three circle openings 30a, 30b and 30c. The circle opening 30a located approximately at the center of the top plate 30 is provided for receiving a generally O-shaped ferrite core 32 therethrough. The circle opening 30b is surrounded by a small cylindrical wall 34 which extends perpendicularly above and below the top plate 30, as shown in FIG. 6. The circle opening 30b is provided for the electric connection between the coil of the transformer and the connector 26 in a manner which will be described in detail later. Another circle opening 30c also surrounded by a cylindrical wall 36 is provided for receiving a lead wire 38 (FIG. 6) therethrough. The lead wire 38 connects the secondary coil of the transformer and a cathode ray tube (not shown) for effecting the horizontal deflection. A detail of the cylindrical wall 36 and the connection between the lead wire 38 and the secondary coil is disclosed in my previous U.S. patent application Ser. No. 242,986 filed Mar. 12, 1981.

Still referring to FIGS. 9a, 9b and 9c, the casing 28 is further formed with a substantially U-shaped frame 40 defined by a pair of stems 42 and 44 spaced a predetermined distance from each other and extending parallelly to the axis of the cylindrical wall 34, and a beam 46 extending between the stems 42 and 44 at the lower end thereof. The bottom face of the beam 46 is in flush with the bottom face of the casing 28. The stems 42 and 44 and the beam 46 are formed with elongated grooves 42a, 44a and 46a, respectively, along inside faces. According to a preferred embodiment, each groove has a U-shape cross-section and the width of each of the grooves 42a and 44a is slightly narrowed towards the lower end, i.e., towards the beam 46. Furthermore, according to a preferred embodiment, a distance between the bottoms of the facing grooves 42a and 44a is reduced towards the beam 46. The beam 46 is formed with a pair of openings 46b and 46c adjacent to the stems 42 and 44, respectively. Such openings 46b and 46c are formed during the process of molding, and are used for receiving terminal legs in a manner described later in connection with FIG. 14.

Referring to FIG. 6, the coil unit 22 further comprises a coil arrangement having primary and secondary coils wound on inner and outer bobbins, respectively, and the ferrite core 32 extending through the inner bobbin. FIG. 6 only shows the secondary coil 31. The detail of the coil arrangement is disclosed in my U.S. Pat. No. 4,334,206 and also in the above mentioned my previous U.S. patent application Ser. No. 242,986.

The outer bobbin which is coaxially mounted on the inner bobbin has a flange 48 at its upper end. The flange 48 is formed with a tongue 50 which extends outwardly from the flange 48. As shown in detail in FIGS. 11a and 11b, the end portion of the tongue 50 remote from the flange 48 is formed with a circle wall 50a extending upwardly, and a slit 50b formed in the tongue 50 approximately at the center of the circle wall 50a. The inner diameter of the circle wall 50a is approximately equal to the outer diameter of the cylindrical wall 34. The tongue 50 is provided for supporting a terminal socket 52, shown in FIGS. 10a and 10b.

Figure 10A:
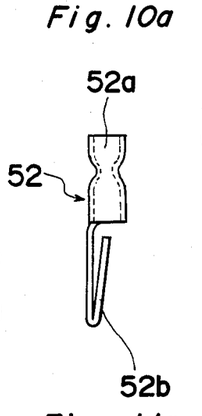
FIGS. 10a and 10b are side and front views, respectively, of a terminal socket employed in the flyback transformer of the present invention.
Figure 10B:
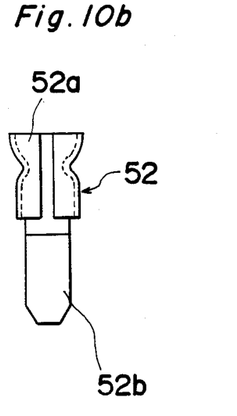
Figure 11A:
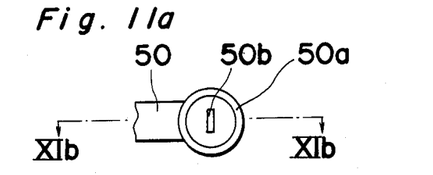
FIG. 11a is a top plan view of a tongue for receiving the terminal socket of FIGS. 10a and 10b.
Figure 11B:
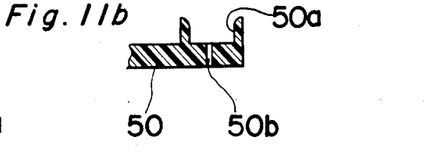
Figure 12:
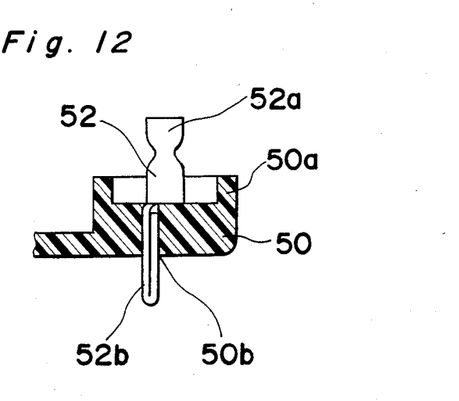
FIG. 12 is a side view partly removed, showing a manner in which the terminal socket of FIGS. 10a and 10b is pressure fitted in a opening formed in the tongue of FIGS. 11a and 11b.

The terminal socket 52, as best shown in FIGS. 10a and 10b, is formed by a high electric conductive material such as phosphor bronze, and is defined by a tubular portion 52a and a leg portion 52b. The tubular portion 52a is formed by bending a rectangular phosphor bronze plate in a shape of tube and, at the same time, applying a pressure at the center thereof to define a neck portion. The leg portion 52b is formed by folding an elongated strip of phosphor bronze plate in two. To install the terminal socket 52 on the tongue 50, the leg portion 52b is pressure fitted into the slit 50b, as shown in FIG. 12, and, as a result, the lower end portion of the leg portion 52b extends downwardly on the side of the tongue 50 opposite to the side provided with the circle wall 50a.

Referring back to FIG. 6, the leg portion 52b is connected by means of, e.g., soldering to a lead line 54 which is in turn connected to a capacitor 56. The capacitor 56 is further connected to a center tap of a secondary coil of the transformer. Preferably, a diode (not shown) may be connected between the capacitor 56 and the center tap, or may be connected between the center tap and a portion of the secondary coil between the center tap and its grounded end. When the coil arrangement is accommodated in the casing 28, the terminal socket 52 is inserted into the cylindrical wall 34 and, at the same time, the circle wall 50a of the tongue 50 fittingly engages with the cylindrical wall 34. Thereafter, the coil arrangement is secured in the casing 28 by a cast-in material 58, such as thermosetting epoxy resin. Terminal legs 55a extend from the bottom of case 28 through circuit board PL.

The variable resistor unit 24 comprises a housing 60 made of synthetic resin and having a shape of rectangular dish, and a circuit board 70 secured in the housing 60. The housing 60 is defined by a concaved rectangular box 62 (FIG. 5) and a flange 64 extending outwardly from three sides of the rectangular box 62, i.e., opposite elongated sides and bottom side.

According to a preferred embodiment, at least one projection (There are two projections 64a and 64b in the example shown in FIG. 5) is formed laterally outwardly on each flange 64 on the elongated side of the rectangular box 62. Also, the thickness of each flange 64 on the elongated side of the rectangular box 62 is tapered towards the bottom end. Moreover, the distance between the free edges of the flanges 64 on the opposite elongated sides becomes slightly small towards the bottom.

The upper side of the rectangular box 62 is formed with two openings surrounded by cylindrical walls 66 and 68, respectively. And, in the two openings, two terminal sockets 69a and 69b, such as one described above in connection with FIGS. 10a and 10b, are mounted, respectively. Inside the rectangular box 62, the terminal sockets 69a and 69b are connected to the circuit board 70 in a manner described later. It is to be noted that, instead of the terminal sockets 69a and 69b, a terminal pin can be mounted in each of the cylindrical walls 66 and 68.

Figure 7:
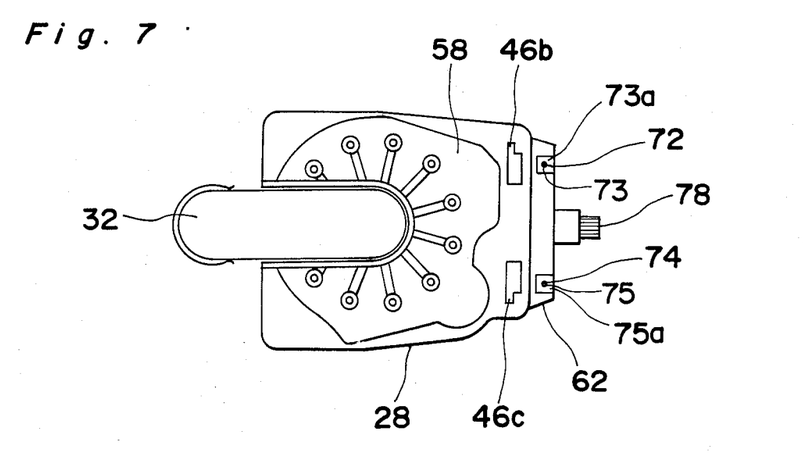
FIG. 7 is a bottom plan view of the flyback transformer of FIG. 4.

The lower side of the rectangular box 62 is formed with two openings 73 and 75 (FIG. 7) for fittingly mounting terminal pins 72 and 74 therein, respectively. The terminal pins 72 and 74 are partly covered by cubic protectors 73a and 75a so as to conceal the terminal pins 72 and 74 above a plane PL (FIG. 6) for mounting the flyback transformer of the present invention. The rectangular box 62 is further formed with two openings for mounting adjustment knobs 76 and 78.

According to a preferred embodiment, the electric connection between terminal socket, e.g., 69a and an electrode of the circuit board 70 is effected by a spring 80 (FIG. 6) which is compressed and mounted between the leg portion of the terminal socket 69a and the electrode of the circuit board 70. Other terminal socket and pins 69b, 72 and 74 are connected to electrodes of the circuit board 70 in the same manner. The circuit board 70 is secured in the rectangular box 62 by a suitable securing member and, thereafter, the box 62 is sealed by a cast-in material 82.

The circuit board 70 comprises a base plate made of electrically non-conductive material and stripes of ohmic resistance elements deposited in a predetermined pattern so as to provide a circuit, such as shown in FIG. 8. The circuit of FIG. 8, given as an example, comprises resistance elements R1 and R2 connected in series between the terminals 69a and 72 and a resistance element R3 connected to the terminal 69b. A runner electrode 84 extends from the resistance element R3 to a position adjacent the resistance element R1, and another runner electrode 86 extends from the terminal 74 to a position adjacent the resistance element R2. A rotatable arm 76' made of electrically conductive material is connected to the knob 76, and another rotatable arm 78' is connected to the knob 78. Accordingly, by the rotation of the knob 76, one end of the arm 76' slidingly moves over the resistance element R1 and its other end pivots on the runner electrode 84. Similarly, by the rotation of the knob 78, the arm 78' slides over the resistance element R2 with its one end connected to the runner electrode 86.

The variable resistor unit 24 described above is detachably mounted on the casing 28 of the coil unit 22 such that the flanges 64 on the rectangular box 62 engage with the grooves 42a, 44a and 46a, as the variable resistor unit 24 slides into the U-shaped frame 40. Preferably, recesses are formed inside the grooves 42a and 44a for the engagement with the projections 64a and 64b. Such an engagement ensures the proper positioning of the variable resistor unit 24 on the casing 28 and, at the same time, prevents the variable resistor unit 24 from being undesirably dropped from the U-shaped frame 40 after the insertion.

Referring to FIG. 6, the connector 26, according to the preferred embodiment, has a configuration of U-shape. The U-shape connector 26 shown comprises a U-shape body 26a formed by a synthetic resin and a lead line 26b extending through the U-shape body 26a. The opposite ends of the lead line 26b protrudes outwardly from opposite ends of the U-shape body 26a. One end of the U-shape body 26a is formed with a circle wall 26c having an inner diameter approximately equal to the outer diameter of the cylindrical wall 34. The other end of the U-shape body 26a is also formed with a circle wall 26d having an inner diameter approximately equal to the outer diameter of the cylindrical wall 66 of the variable resistor unit 24.

The connector 26 is mounted in such a manner that the circle wall 26c of the connector 26 is fittingly mounted on the cylindrical wall 34 and, at the same time, one end of the lead line 26b is pressure fitted into the terminal socket 52. Similarly, the circle wall 26d is fittingly mounted on the cylindrical wall 66 and, at the same time, the other end of the lead line 26b is pressure fitted into the terminal socket 69a.

When in use, the flyback transformer 20 of the present invention described above is mounted on the printed circuit PL. When the primary and secondary coils are excited, the terminal 69a of the variable resistor unit 24 receives a predetermined high voltage from the terminal socket 52 of the coil unit 22 through the connector 26. Such a high voltage is adjusted by a knob 76 so as to produces a focusing voltage from the terminal 69b. The voltage applied to the terminal 69a is also adjusted by a knob 78 so as to produce a screen voltage from the terminal 74. The terminal 72 is connected to ground.

For some reason or other, if either one of the coil unit 22 or variable resistor unit 24 should break, it can be exchanged simply by removing the connector 26 and separating the units 22 and 24 apart. After the exchange, the units can be joined together in the same manner described above.

Figure 13:
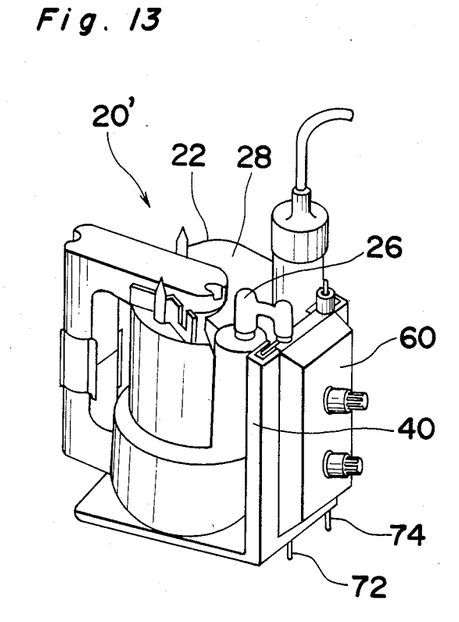
FIG. 13 is a perspective view of a flyback transformer according to the second embodiment of the present invention.
Figures 14, 16:
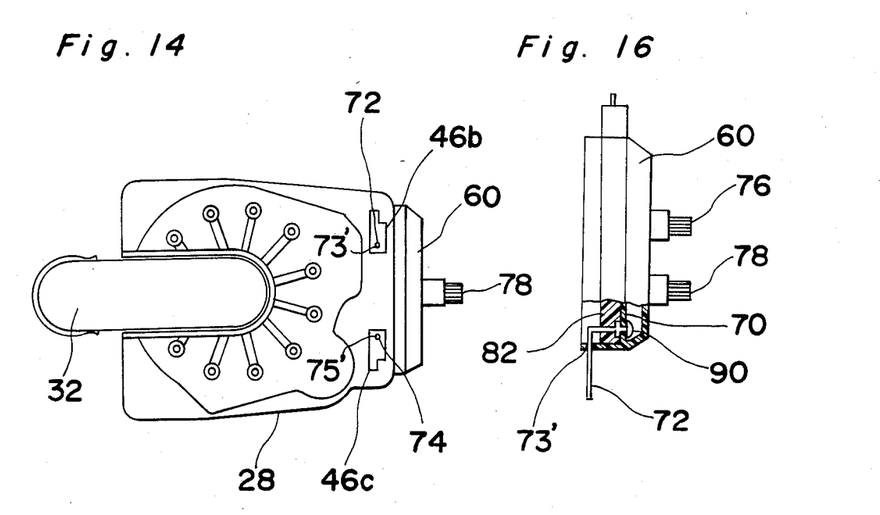
FIG. 14 is a bottom plan view of the flyback transformer of FIG. 13.
FIG. 16 is a side view partly removed of the variable resistor unit of FIG. 15.
Figure 15:
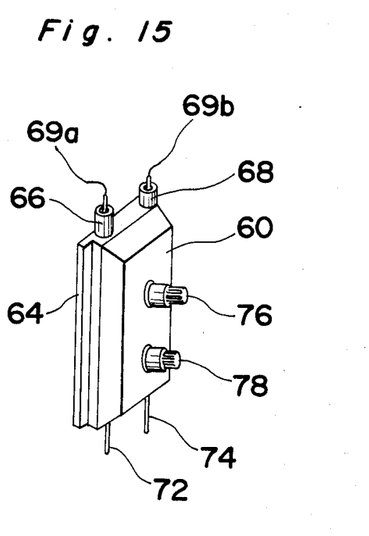
FIG. 15 is a perspectively view of a variable resistor unit employed in the flyback transformer of FIG. 13.

Referring now to FIG. 13, there is shown a flyback transformer 20' according to the second embodiment of the present invention. When compared with the first embodiment, the flyback transformer 20' of the second embodiment has a different variable resistor unit 24. Particularly, the positioning of the terminal pins 72 and 74 is different. Referring particularly to FIG. 16, each of the terminal pins 72 and 74 (only the terminal pin 72 is shown) is presented in a shape of L with one end connected to the electrode of the circuit board 70 by the deposition of solder bead 90 and the other end extending outwardly and downwardly from the housing 60 through opening 73', 75' formed in a bottom face of the housing 60. When variable resistor unit 24 of the second embodiment is mounted on the casing 28 in the above described manner, the terminal pins 72 and 74 projects downwardly from the casing 28 through the openings 46b and 46c formed in the beam 46. Therefore, there is no need to provide any concealment block, such as cubic protectors 73a and 75a described above, on the terminal pins 72 and 74.

According to the flyback transformer of the present invention, since the connector 26, which connects the coil unit 22 with the variable resistor unit 24, is very short and located above the casing 28, various electric components located around the flyback transformer will not be adversely affected by the high voltage signal passing through the connector 26. Furthermore, the area necessary for the installation of the flyback transformer of the present invention can be reduced. Moreover, since the connection between the unit 22 and 24 can be readily carried out by the step of mounting the connector 26 from the top, the manufacturing step can be simplified.

When compared with the prior art flyback transformer of FIG. 1, there is no lead line 6 extending from the casing and, therefore, the maintenance of the flyback transformer of the present invention can be simplified.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:
1. A flyback transformer comprising:
  a casing having a coil disposed therein, said casing providing a first opening, said first opening disposed adjacent the periphery of said casing, said casing further having a plurality of terminal legs extending therefrom and electrically connected to said coil;
  a first terminal positioned in said first opening and electrically connected with said coil;
  mounting means disposed in the outside of said casing securing a component on the peripheral surface of said casing;
  a component housing having a second opening formed thereon and at least one terminal pin extending therefrom and electrically connected thereto;
  an electrical resistance element disposed within said component housing;
  a second terminal positioned in said second opening and electrically connected with said electrical resistance element;
  engaging means, disposed on said component housing, in cooperative engagement with said mounting means such that said component housing is detachably mounted on the surface of said casing, the axial direction of said first opening is aligned in parallel with the axial direction of said second opening, and such that said terminal pin is in parallel with and extending in the same direction as said terminal legs such that said terminal legs and terminal pin extend through a plane perpendicular thereto so as to be mounted on a common circuit board; and
  connector means providing an electrical connection between said first terminal and said second terminal, said connector means disposed between said first and second terminals.

2. The flyback transformer of claim 1, wherein said connector means includes insulation means for electrically insulating said connector, said insulation means providing one end connectable with said first opening and another end connectable with said second opening.

3. The flyback transformer of claim 1 wherein said electrical resistance element is a variable resistor.

4. A flyback transformer as claimed in claim 2, wherein said connector means has the configuration of a U-shape, said conductor means having a contact portion extending outwardly from one end of said U-shaped connector means and another contact portion extending outwardly from other end of said U-shaped connector means.

5. A flyback transformer as claimed in claim 1, wherein said mounting means comprises a pair of stems extending parallel to each other and a beam extending between said stems, said stems and said beam having a groove formed along inside faces thereof.

6. A flyback transformer as claimed in claim 5, wherein said engaging means comprises a flange formed along a peripheral side of said component housing, said flange being slidably engageable in said groove.

7. A flyback transformer as claimed in claim 1, wherein said component housing further has a third opening.

8. A flyback transformer as claimed in claim 7, further comprising a third terminal positioned in said third opening, said third terminal being electrically connected to said electrical resistance element.

9. A flyback transformer as claimed in claim 5, wherein said beam is formed with first and second holes.

10. A flyback transformer as claimed in claim 9, wherein said component housing further has a fourth opening.

11. A flyback transformer as claimed in claim 10, wherein said fourth opening comprises a protection wall surrounding said fourth opening.

12. A flyback transformer as claimed in claim 11, further comprising a fourth terminal extending through said fourth opening, said fourth terminal electrically connected to said electrical resistance element.

13. A flyback transformer as claimed in claim 12, wherein said fourth terminal extends through said first hole.

14. A flyback transformer as claimed in claim 9, wherein said component housing further has an auxiliary opening.

15. A flyback transformer as claimed in claim 14 wherein said auxiliary opening comprises a protection wall surrounding said auxiliary opening.

16. A flyback transformer as claimed in claim 15, further comprising an auxiliary terminal extending through said fifth opening, said auxiliary terminal electrically connected to said electrical resistance element.

17. A flyback transformer as claimed in claim 16, wherein said auxiliary terminal extends through said second hole.

18. A flyback transformer as claimed in claim 1, wherein said electrical resistance element comprises a base plate made of electrically non-conductive material and ohmic resistance stripes deposited in a predetermined pattern.

19. A flyback transformer as claimed in claim 18, further comprising at least one adjustment knob mounted on said component housing, said adjustment knob having a conductive member pivotally held in contact with said base plate for forming a variable resistance element.

* * * * *